United States Patent
Rolfes

[11] 3,985,394
[45] Oct. 12, 1976

[54] TRACTOR-IMPLEMENT CONTROL SYSTEM

[75] Inventor: Marlan John Rolfes, Ottumwa, Iowa

[73] Assignee: Deere & Company, Moline, Ill.

[22] Filed: Apr. 7, 1975

[21] Appl. No.: 565,867

[52] U.S. Cl. .............................. 302/34; 180/77 R; 280/421; 302/61
[51] Int. Cl.² .................. B65G 53/04; B65G 53/34
[58] Field of Search ............... 302/60, 61, 1, 59, 34; 285/1, 304; 137/344, 608; 74/527, 529, 531; 251/89, 128, 231, 232, 279; 56/10.8, 10.9, 11.9; 180/14 R, 77 R; 280/421, 422

[56] References Cited
UNITED STATES PATENTS

| | | | |
|---|---|---|---|
| 3,140,102 | 7/1964 | Johnson | 280/421 |
| 3,329,225 | 7/1967 | Dunn | 280/421 X |
| 3,793,156 | 2/1974 | Kanengieter | 302/60 |

Primary Examiner—John J. Love
Assistant Examiner—James L. Rowland

[57] ABSTRACT

An agricultural tractor has a cab enclosed operator station and a pair of rearward hydraulic coupling elements, one of which is selectively connected to the tractor fluid pressure supply and the other of which is connected to the tractor reservoir by means of a control within the cab. The tractor tows and powers a pull-type forage harvester having three hydraulic cylinders that respectively control the deflection of the discharge spout cap, the rotation of the discharge spout, and the transmission control lever that controls the rotational direction of the feed roll drive. A valve package is removably mounted on the exterior of the cab rear wall and has a pair of inlet lines respectively connected to the tractor hydraulic coupling elements, three sets of hydraulic lines to the respective hydraulic cylinders on the forage harvester, and three control valves for controlling the flow of fluid between the inlet lines and the three sets of outlet lines. The control valves are controlled from within the tractor by three control levers pivotally mounted on the rear wall of the tractor and having rearward ends on the exterior of the tractor removably connected to the three control valves, the control valve package being mounted on the rearward wall of the tractor by means of a latching device that permits rearward separation of the control valve housing from the cab upon the application of a rearward force on the housing in excess of a predetermined amount, the control valves being freely separated from the control levers upon separation of the control valve housing from the cab.

13 Claims, 4 Drawing Figures

TRACTOR-IMPLEMENT CONTROL SYSTEM

BACKGROUND OF THE INVENTION

This invention relates to a control system for controlling a number of functions on an agricltural implement, such as a forage harvester or the like, from an operator's station on the tractor.

Farm implements, such as forage harvesters, conventionally have a nuumber of components or functions that are adjusted during the operation and transport of the machine. Such functions as the header lift system have been controlled by hydraulic cylinders controlled from the tractor, hydraulic outlets or coupling elements being provided on the rear of the tractor for connection to hydraulic lines on the implement via disconnectible couplers, the supply and exhaust from the outlets being controlled by control levers at the operator's station on the tractor. However, adjustable functions on the forage harvester, such as the position of the discharge spout deflector cap, the rotational position of the discharge spout, or the condition of the feed roll transmission have required less power, and have been manually controlled by control linkages or rods extending forwardly from the implement to the tractor operator station for manual control by the operator from the tractor seat.

However, in more recent years, an increasing number of tractors have been provided with fully enclosed cabs, the majority of newer tractors used for field work being provided with cabs that are not only fully closed, but sealed and pressurized to prevent the entry of dust, sound-proofed, heated, and air conditioned. Of course, it is impossible to manipulate control rods or linkages from a tractor seat from a fully enclosed operator station, and it is therefore known to provide electro-hydraulic control systems for controlling the low power adjustable functions on the implement, the electro-hydraulic systems including switches at the operator's station and electric lines leading to electro-hydraulic devices on the implement. Newer tractors are conventionally provided with up to three pairs of hydraulic outlets at the rear of the tractor for controlling up to three remote hydraulic cylinders, so that in some cases it is possible to control two additional functions on the implement in addition to the header lift system. However, in some cases, the tractor may only be equipped with one or two sets of outlets, and it is therefore not possible to utilize the tractor hydraulic system for remotely controlling all of the hydraulic functions on the implement.

SUMMARY OF THE INVENTION

According to the present invention, there is provided an improved system for controlling multiple functions on a trailing implement from within a tractor cab. More specifically, the control system utilizes a conventional pair of hydraulic outlets on the tractor for a source of fluid pressure to power the control system.

An important feature of the invention resides in the provision of a single control package that is removably mounted on the tractor cab and connected to the various functions on the implement, the package normally being removed from the tractor cab and left with the implement when the implement is disconnected from the tractor. More specifically, the control package is a hydraulic valve package and is connected to the tractor so that it breaks away from the tractor upon the exertion of a predetermined amount of force on the valve package, to permit easy removal of the valve package or to permit removal of the valve package without damage to the hydraulic lines in the event the operator forgets to disconnect the valve package at the same time that the tractor is disconnected. Further, the valve package is connected to the tractor through the conventional breakaway hose couplings, which supply the hydraulic power for the control system, to further facilitate the hydraulic connection of the implement to the tractor and to facilitate the breaking away of the system in the event that the hoses are inadvertently left connected when the tractor and implement are separated.

Still another important feature of the invention resides in the provision of control levers that extend through the wall of the cab for actuation of the valves in the control package from the interior of the cab while permitting free separation of the control levers from the valves when the valve package is removed from the cab. Another feature resides in the fact that the control levers remain with the cab, and can be utilized to control other valve packages associated with other implements, and further in the provision of means for sealing the cab around the control levers so that exterior noise and dust are reduced within the cab.

Still another feature of the invention resides in the simple latching device for removably mounting the valve package on the cab.

DESCRIPTION OF THE PREFERRED EMBODIMENT

Figure 1:
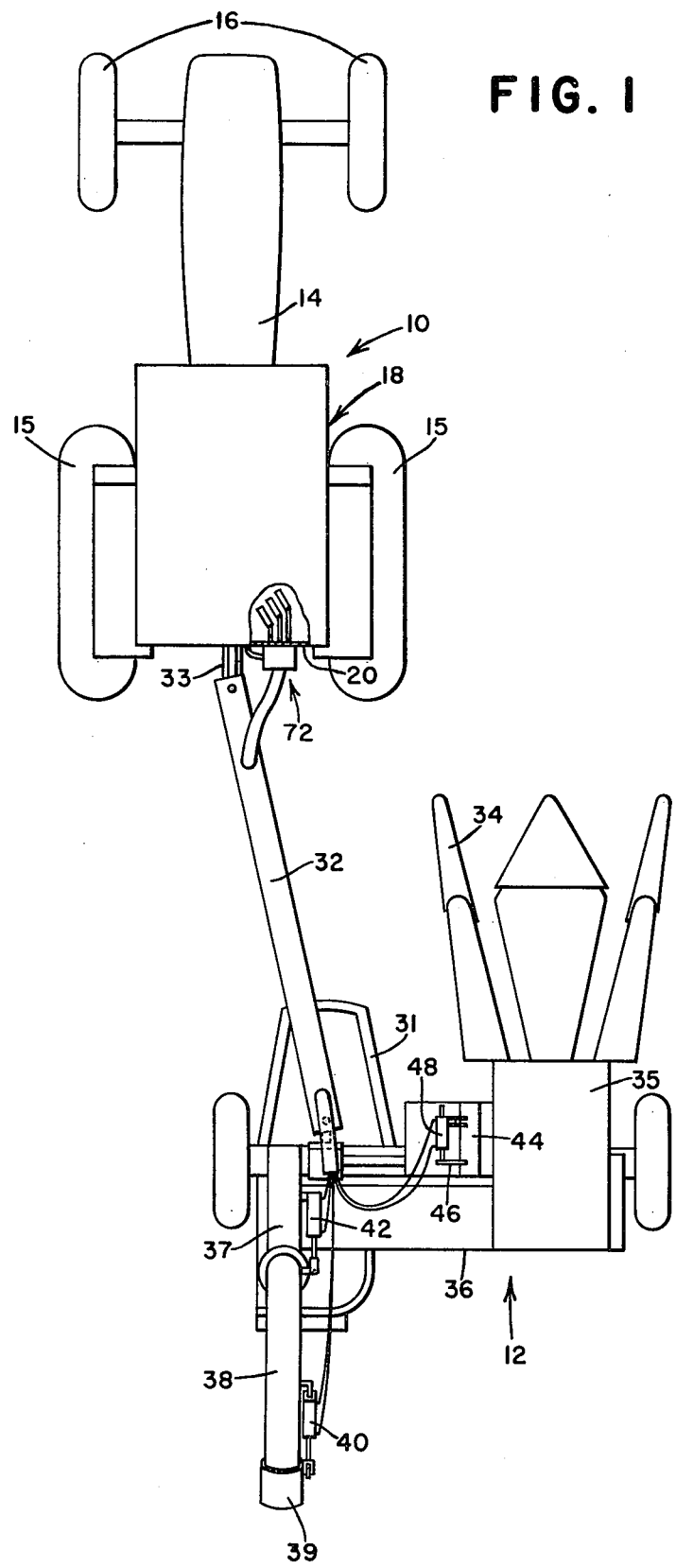
FIG. 1 is a schematic plan view of a tractor and pull-type forage harvester towed by the tractor and embodying the improved tractor implement hydraulic control system.

The invention is embodied in a tractor implement combination that is schematically illustrated in FIG. 1, wherein the numeral 10 indicates a tractor in general and the numeral 12 indicates the implement, the implement being a typical pull-type forage harvester.

The tractor includes a fore and aft body 14 mounted on a pair of rear drive wheels 15 and steerable front wheels 16, the vehicle operator's station being enclosed within a cab 18 disposed between the two rear wheels. As is well known, an operator's seat and the tractor controls are all mounted in the cab, the cabs on current machines generally completely enclosing the operator's station, and being pressurized and provided with sound deadening material, vibration isolation, heating, and air conditioning equipment. The cab has an upright rear wall 20, the upper portion of which is glass as is conventional, the other walls also being at least partially made of glass to afford all around visibility for the operator.

Figure 2:
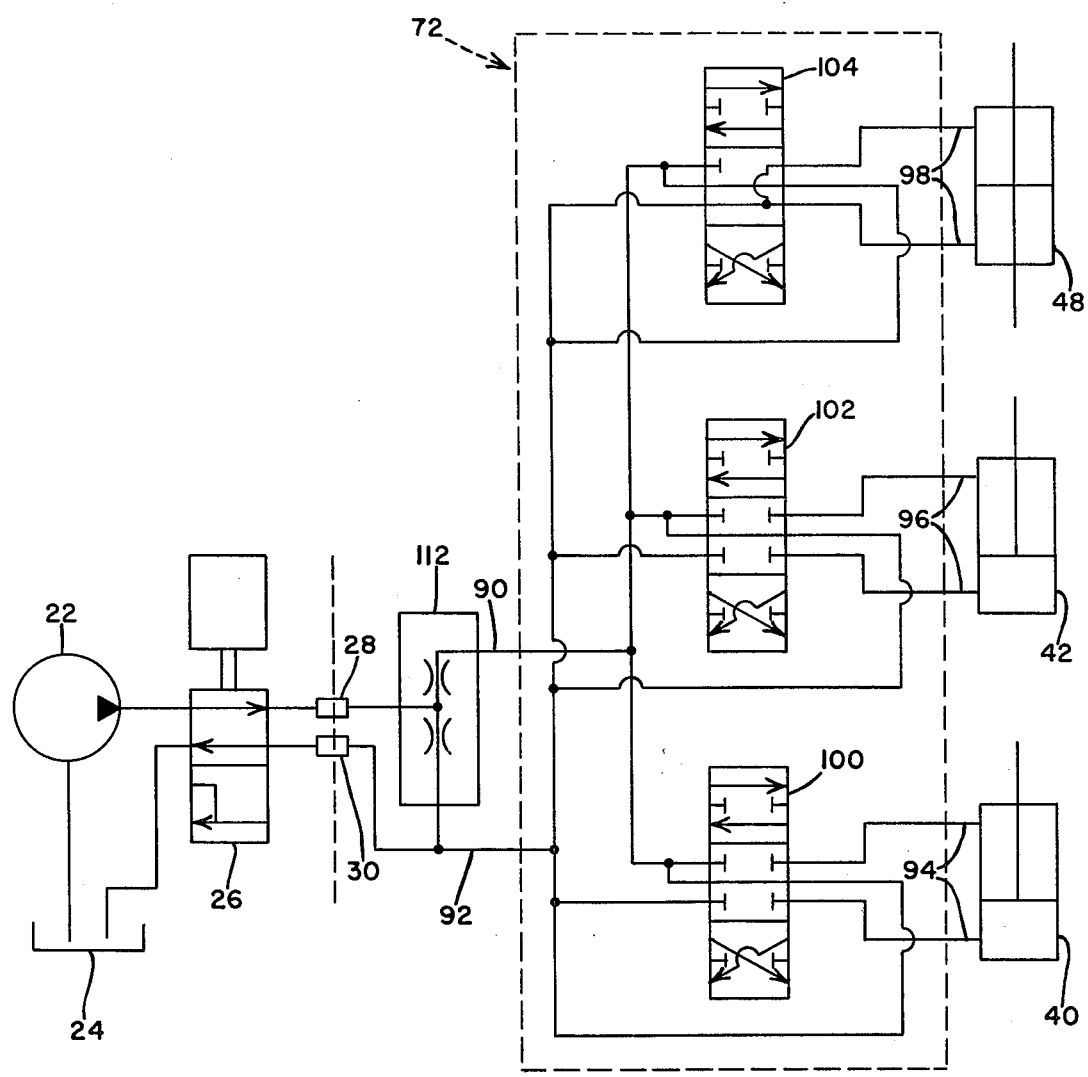
FIG. 2 is a schematic layout of the hydraulic control system.

As is conventional, the tractor includes a hydraulic pump 22, having an associated reservoir 24, and a manually actuated control valve 26 for controlling the fluid flow through a pair of hydraulic coupling elements or outlets on the rear of the tractor. Such coupling elements are well known, and up to three pairs of such coupling elements are provided on newer tractors, although in some cases only one or two coupling elements are provided. The coupling elements mate with coupling elements on the ends of hydraulic lines to form disconnectible couplings, indicated by the numerals 28 and 30. An example of such couplings is shown in U.S. Pat. No. 3,130,749, also assigned to the assignee herein, the couplings providing for rearward disconnection without loss of hydraulic fluid upon the exertion of a predetermined amount of pull on the rear part of the coupling. The couplings are schematically illustrated in FIG. 2, wherein the dotted line through the couplings represents the separation point between the tractor hydraulic system and the implement system.

The forage harvester type implement 12 includes a mobile frame 31 having a forwardly extending draft member or tongue 32 that is releasably connectible to a rearward drawbar 33 on the tractor, as is well known. The forage harvester includes a forward, row crop type harvesting header 34 that is mounted on the forward end of a cutter head housing 35, the header removing the crop from the field and delivering it to feed rolls and a cutterhead mounted in the cutterhead housing 35, as is well known. As is also known, the cutterhead reduces the crop and delivers it to a transverse auger in a auger housing 36 at the rear end of the machine, which moves the reduced crop laterally to a blower 37 at the left side of the machine. The blower in turn impels the crop upwardly and rearwardly through an arcuate discharge spout 38 that swivels about an upright axis to vary the direction that the crop material is thrown. A deflector cap 39 is provided at the discharge end of the spout 38 to vary the distance that the crop is thrown. The crop is normally discharged into a trailing wagon (not shown) and the discharge cap 39 and the discharge spout 38 are frequently adjusted during the operation of the machine to evenly fill the entire wagon and to remain the flow of crop material into the wagon as the machine is making turns. The position of the discharge cap is controlled by a hydraulic cylinder 40 operative between the spout and the cap, as schematically shown in FIG. 1, although generally the control cylinder for the cap is not directly connected to the cap but is rather connected to the cap through some sort of linkage, so that the cylinder is mounted on a lower part of the harvester. The swiveling motion of the discharge spout 36 is controlled by a hydraulic cylinder 42. The length of cut of the crop depends on the rage at which it is fed to the cutterhead, and a shiftable transmission 44 is provided to drive the feed rolls at alternate speeds, the direction of rotation of the transmission output being controlled by a swingable control lever 46 that is shiftable between forward, neutral and reverse positions. A hydraulic cylinder 48 is operative between the implement frame and the transmission control lever to control the position of the control lever and consequently the feed roll rotation.

Mounted on the cab rear wall 20 is a bank of three control levers 50, 51, and 52. As is apparent from FIGS. 3 and 4, the control levers in a generally fore and aft direction and have angled handles at their forward ends, which are disposed adjacent to the operator's seat within the cab 18, the lengths of the control levers decreasing from right to left to facilitate their manipulation by the operator. The cab rear wall 20 is provided with an opening 54 through which the control levers 50, 51, and 52 extend, the rearward ends of the control levers being disposed exteriorally of the cab. The levers are mounted on the rear wall for vertical rocking movement on a transverse pivot 56 that is carried by an upright transverse bracket 58, which is mounted on the exterior side of the cab rear wall 20 by four bolt and nut fasteners 60 adjacent the four corners of the opening 54. A flexible sealing element 62 is provided over the opening 54 between the bracket 58 and the rear wall, the control levers 50 extending through corresponding slits in the seal element. The seal element flexes to allow vertical adjustment of the levers while preventing the entry of dust and foreign material into the cab. As is apparent, the control levers and the bracket on which they are mounted normally remain with the cab once a control system is installed, and when a tractor is initially being provided with a control system, it is only necessary to provide an opening in the rear wall of the cab and to thereafter mount the bracket 58 over the opening with the control levers extending through the opening.

A rearwardly open generally U-shaped latch member 64 is mounted on the bracket 58 and includes a pair of rearwardly extending arms 65 and 66 and a transversely extending center portion 67, which is secured to the bracket by means of the lower pair of fasteners 60. As is apparent, the latch member remains with the cab along with the bracket and control levers. The rearward ends of the arms 65 and 66 are provided with opposite, inward projections or detent elements 68 and 70 respectively, and a valve package, indicated in its entirety by the numeral 72 is releasably mounted on the cab by means of the latch member 64, the valve package being retained between the opposite detent elements 68 and 70.

Figure 3:
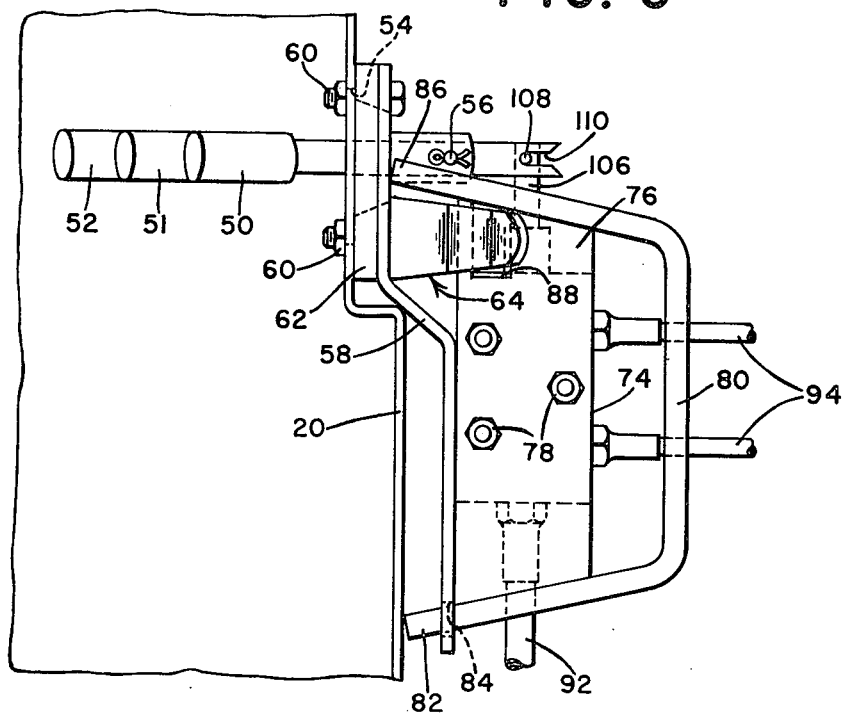
FIG. 3 is an enlarged side elevation view of the control system valve package mounted on the rear wall of the tractor cab.

The valve package includes a block-like housing 74 having a pair of upright fore and aft plates 76 attached to its opposite sides by bolt and nut type fasteners 78 extending through the housing 74. A pair of forwardly open upright U-shaped handles 80 are respectively attached to the side plates 76, and each handle 80 has a forward lower end 82 which is receivable in a hole 84 in the bracket 58 when the housing 74 is properly positioned for engagement by the latch members 64, as shown in FIG. 3. As is also apparent in FIG. 3, each handle 80 has an upper forward end 86 that seats against the bracket on opposite sides on the bank of control levers, and the rearward central portions of the handles are spaced rearwardly from the side plates 76 to form a gripping element for easy manipulation of the valve package. Each side plate 76 is provided with an opening 88 that receives the opposite detent elements 68 and 70 when the valve package is mounted in the latch member.

The housing is provided with a pair of downwardly extending inlet lines 90 and 92, which are of conventional hydraulic hose construction, the ends of the lines 90 and 92 being respectively provided with the releasable coupling elements that mate with the tractor coupling elements to form the couplings 28 and 30. The housing is also provided with three pairs of laterally spaced outlet lines 94, 96, and 98 respectively, the lines of each pair being vertically offset and being laterally offset from the adjacent pair of lines. The pair of lines 94 extends rearwardly to the cap control cylinders 40, the second pair of lines 96 extends rearwardly to the discharge spout control cylinder 42, and the third pair of lines 98 extends rearwardly to the transmission control cylinder 48, the three pairs of lines extending rearwardly in a common duct along the forage harvester tongue or draft member 32.

Figure 4:
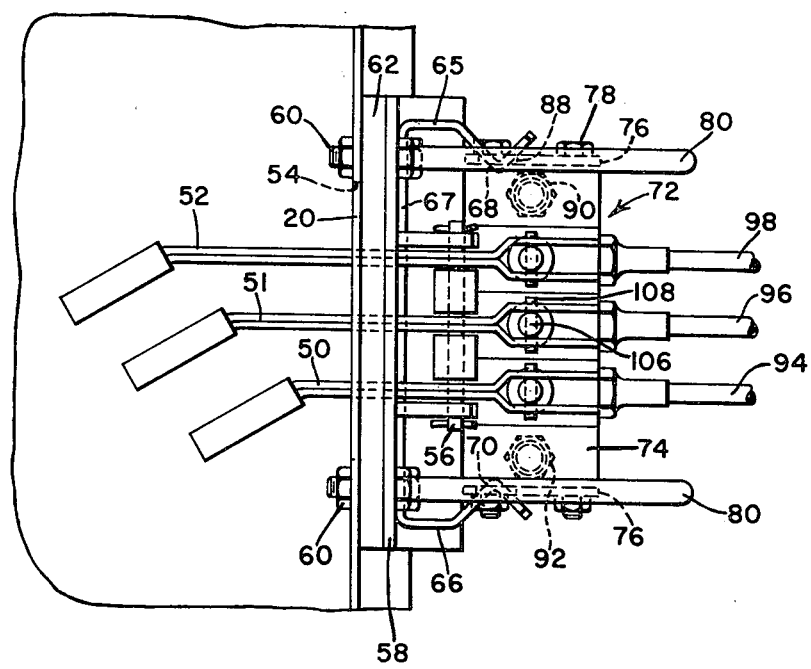
FIG. 4 is a top plan view of the valve package shown in FIG. 3.

Mounted in the housing 74 are three control valves 100, 102 and 104 respectively, which respectively control the flow of fluid between the inlet lines and each pair of outlet lines. The valves are conventional spool type valves, and each valve has a valve actuating element 106 associated with the valve spool and extending upwardly from the housing 74. Each valve actuating element 106 includes a transverse pin 108. The rearward ends of the control levers 50, 51 and 52 are bifurcated, as shown in FIG. 4, and are provided with a rearwardly open fore and aft slot 110 that receives the valve actuating pin 108 of one of the valves when the valve package is mounted on a cab as shown in FIG. 3. As is apparent, when the valve package is mounted on the cab, vertical movement of the forward end of one of the control levers will cause corresponding vertical movement in the opposite direction of the corresponding valve actuating element 106, while the rearwardly open slot 110 permits unimpeded rearward movement of the valve actuating element to disconnect the control lever from the valve actuating element when the valve package is pulled rearwardly from the cab.

The hydraulic control system can be adapted for use with a tractor having either a closed center or an open center hydraulic system, a schematic of the hydraulic system for a tractor with an open center system being shown in FIG. 2. To provide for an adequate flow rate without excessive pressure drop through the system when an open center system is being utilized, a flow divider valve 112 is provided between the tractor outlets 28 and 30 and the inlets in the valve body. As is apparent, this system can be adapted for a tractor having a closed center system by simply removing the flow divider valve 112 and providing means in the valve housing for closing the open centerline through the valves.

In operation, the control levers 50, 51 and 52 and the latch member 64 are mounted on the tractor cab 18 via the bracket 58, so that said components remain with the tractor. When an implement utilizing the control system is connected to the tractor, the valve package 72 is mounted on the rear wall of the cab by first inserting the lower forward ends 82 of the handles 80 into the holes 84 in the bracket to properly align the valve package relative to the latch member, and then swinging the valve package forwardly so that the latch member arms 65 and 66 are spread by the valve housing side plates 76. When the detent elements or projections 68 and 70 on the latch member arms reach the openings or holes 88 in the valve housing plates 76, the arms spring inwardly and the detent elements hold the valve package in the latch members 64. The hydraulic inlet lines 90 and 92 are then simply attached to the tractor via the releasable couplings 28 and 30 in the known manner, and hydraulic pressure can then be supplied to the system by actuating the control valve 26 at the operator's station to connect one of the inlet lines to the tractor pump and the other to the reservoir. The valve package outlet lines, of course, remain connected to their respective cylinders, even when the valve package is removed from the cab.

The valves 100, 102, and 104 can then be actuated from inside the tractor via the control levers 50, 51 and 52 to selectivly supply fluid pressure to the cylinders 40, 42 and 48. The cylinder 48 for the feed roll transmission is shown as a double ended cylinder, so that the cylinder is hydraulically balanced whereby leakage through the valve 104 and back pressure in the return lines therefrom do not create a hydraulic imbalance in the cylinder 48, which could possibly inadvertently shift the feed roll transmission.

To disconnect the hydraulic system, the reverse operation is simply followed, the valve package being removed by pulling rearwardly on the handles to force the detent elements 68 and 70 from the holes 88 and thereby release the valve package from the latch member. The inlet lines are simply detached from the tractor outlets in the known manner. As is apparent, when the valve package is moved rearwardly, the pins 108 freely move out of the slots 110 to disengage the valves from the control levers. If the operator uncouples the inplement and forgets to uncouple the control system, as the tractor is pulled away from the implement, a rearward pull will be exerted on the valve package which will pull it out of the latch member and thereby disconnect the valve package from the cab. Further forward movement of the tractor would separate the couplings 28 and 30, in the known manner.

While the control system is illustrated with a forage harvester, it is apparent that the system could be utilized with other implements having multiple hydraulic functions. Further, while a three valve system is illustrated, it is apparent that a system can be utilized to control a greater number of hydraulic functions by simply adding additional valves and control levers. For example, in a forage harvester such as the forage harvester illustrated herein, a hydraulic cylinder could be provided to position the tongue 32 relative to the implement frame 31 to shift the implement between operating and transport positions, and the tongue position control cylinder could be included in control pull system by merely adding another control lever and another valve to the valve package. Also, the removable control package concept could be applied to a mechanical control system or the like, wherein the control levers would remain with the cab, and a control package would be removably mounted on the cab exterior and removably connected to the control levers, the control package being connected to the shiftable functions on the harvester by conventional means and remaining with the harvester.

I claim:

1. In a tractor-trailing implement combination wherein the tractor includes a support structure adjacent an operator's station, a pair of hydraulic coupling elements respectively connectible to a fluid pressure source and a reservoir on the tractor, and the implement is pivotally connected to the tractor and includes a plurality of shiftable functions and hydraulic motor means respectively associated with said functions for shifting them into different positions, the combination therewith of an improved hydraulic system for controlling the flow of pressurized fluid between the hydraulic motor means and the tractor coupling elements comprising: a valve housing having a pair of inlets; means removably mounting the valve housing on the support structure; hydraulic lines respectively connecting the tractor coupling elements to the housing inlets; a plurality of pairs of outlets in the valve housing; hydraulic lines connecting each pair of outlets to the opposite sides of a hydraulic motor means said housing being supported only on said tractor support structure and connected to the implement only through said hydraulic lines; a plurality of hydraulic valve means mounted in the valve housing, each valve means including an actuating element and being operative to control the flow of fluid between the housing inlets and a pair of outlets and the hydraulic motor means connected thereto when one of the inlets is connected to the tractor pump and the other to the tractor reservoir; and a plurality of control members mounted on the support structure and respectively removably connectible to the actuating elements of the valve means, so that the respective control valve means are actuatable from the operator's station.

2. The invention described in claim 1 wherein the means for mounting the valve housing on the support structure includes a releasable latch means adapted to permit separation of the housing from the support structure upon the exertion of a force in excess of a predetermined amount.

3. The invention described in claim 2 wherein the releasable latch means comprises a pair of arms mounted on and extending rearwardly from the support structure and having detent elements adjacent their rearward ends that deflect outwardly and seat in recesses associated with the opposite lateral sides of the housing, the deflection of the detent elements biasing the detent elements into the recesses to lock the housing to the arms, the detent elements deflecting further outwardly in response to a rearward pull on the housing in excess of the predetermined amount to permit separation of the detent from the recesses.

4. The invention described in claim 3 and including a pair of forwardly open U-shaped members mounted on opposite lateral sides of the housing, the U-shaped members functioning as handles for manipulation of the valve housing, and the lower, free ends of the U-shaped members being receivable in a pair of laterally spaced apertures in a bracket attached to the rear wall of the cab when the housing is mounted on the cab to orient the housing in the proper relationship with the latch means.

5. The invention described in claim 1 wherein the operator's station includes a cab having a rear wall forming said support structure and having an opening and the control members comprise a plurality of control levers mounted side by side and vertically adjustable on transverse pivot means mounted on the rear wall adjacent the opening and seal means disposed in the opening to seal the area between the levers and the cab wall while permitting limited vertical adjustment of the levers.

6. The invention described in claim 5 wherein the means mounting the valve housing on the cab includes a releasable latch means adapted to permit the rearward separation of the housing from the cab wall upon the exertion of a rearward pulling force on the housing in excess of a predetermined amount, and including means connecting the rearward ends of the control levers to the respective valve actuating elements for permitting rearward separation of the actuating elements from the control levers while causing vertical adjustment of the actuating elements in response to vertical movement of the control levers.

7. The invention described in claim 6 and including releasable coupling means respectively connecting the hydraulic lines associated with the housing inlets to the tractor coupling elements to permit separation of the lines from the tractor upon the exertion of a rearward force on the lines in excess of a predetermined amount.

8. In a tractor-trailing implement combination wherein the tractor includes an operator's station enclosed in a cab having a rear wall and a pair of hydraulic coupling elements respectively connectible to a fluid pressure source and a reservoir on the tractor, and the implement is separate from and pivotally connected to the tractor and includes a plurality of functions controlled by hydraulic motor means, the combination therewith of an improved hydraulic system for controlling the flow of pressurized fluid between the hydraulic motor means and the tractor coupling elements comprising: a plurality of control levers pivotally mounted on and extending through the rear wall, the control levers having portions interiorly of the cab and outer portions on the exterior of the cab that are adjustable in response to movement of the inner portions; a valve package including a pair of inlet lines respectively connectible to the tractor coupling elements, a plurality of pairs of outlet lines, each pair of outlet lines being connected to the opposite sides of a hydraulic motor means, and a plurality of hydraulic valves, each valve including a shiftable actuating element operative to control the flow of fluid between the inlet lines and a pair of outlet lines; means removably mounting the valve package only on the rear wall of the cab; and means releasably connecting the outer portions of the control levers to the respective valve actuating elements to provide for the actuation of the respective valves in response to adjustment of the outer portions of the respective control levers.

9. The invention defined in claim 8 wherein the means mounting the valve package on the cab wall includes a releasable latch means adapted to permit separation of the valve package from the cab wall upon the exertion of a rearward force on the valve package in excess of a predetermined amount.

10. The invention defined in claim 9 wherein the means connecting the rearward exterior portions of the control levers to the respective valve actuating elements comprises a rearwardly open transverse slot in each control lever engagable by transverse pin carried by each actuating element to permit unimpeded rearward separation of each valve actuating element from the control lever while providing for vertical adjustment of the rearward end of the control lever and the actuating element in unison.

11. The invention defined in claim 8 wherein the rear wall of the cab is provided with an opening through which the control levers extend, and including a bracket mounted on the rear wall of the cab and carrying a transverse pivot means on which the control levers are mounted for vertical swinging adjustment.

12. The invention defined in claim 8 wherein the implement comprises a forage harvester having a discharge spout swingable about a vertical axis, a first hydraulic motor for swinging the discharge spout, a deflector cap swingably mounted at the discharge end of the discharge spout, and a second hydraulic motor operative to swing the deflector cap, the control valve means including first and second control valves respectively connected to the first and second hudraulic motors for controlling the flow of pressurized fluid to and from said motors.

13. In a tractor-trailing implement combination wherein the tractor includes an operator's station enclosed in a cab having a rear wall and the implement is pivotally connected to the tractor and includes a plurality of shiftable functions, the combination therewith of an improved control system for controlling the shiftable functions from within the cab, comprising: a plurality of control levers swingably mounted on the cab rear wall and having handle portions interiorly of the cab and outer portions exteriorly of the cab and shiftable in response to movement of the handle portions; a control package having a plurality of shiftable activating elements respectively operatively connected to the shiftable implement function for shifting the functions in response to movement of the actuating elements; releasable latch means removably mounting the control package on the rear wall of the cab adjacent to the control levers; and means separably connecting the respective control lever outer portions to the control package actuating elements when the control package is mounted on the cab rear wall so that movement of the control lever handle portions shifts the actuating elements while permitting separation by the actuating elements from the control levers when the control package is removed from the cab rear wall.

* * * * *